(12) United States Patent
Azumi

(10) Patent No.: US 11,370,614 B2
(45) Date of Patent: Jun. 28, 2022

(54) CARRIAGE AND TRANSPORT SYSTEM

(71) Applicant: SHARP KABUSHIKI KAISHA, Sakai (JP)

(72) Inventor: Shinichi Azumi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 290 days.

(21) Appl. No.: 16/733,969

(22) Filed: Jan. 3, 2020

(65) Prior Publication Data

US 2020/0223631 A1 Jul. 16, 2020

(30) Foreign Application Priority Data

Jan. 10, 2019 (JP) .............................. JP2019-002962

(51) Int. Cl.
*G06F 7/00* (2006.01)
*B65G 1/137* (2006.01)
*B65G 17/12* (2006.01)

(52) U.S. Cl.
CPC ............. *B65G 1/137* (2013.01); *B65G 17/12* (2013.01)

(58) Field of Classification Search
CPC .. B65G 1/137; B65G 17/12; B60D 2001/005; B66F 9/0755; B66F 9/063; B62D 53/04; B60W 30/09; B60W 30/095

USPC .......................................... 700/213–214, 228
See application file for complete search history.

(56) References Cited

U.S. PATENT DOCUMENTS

| 10,209,682 B1* | 2/2019 | Hebert ................. G05D 1/0234 |
| 11,038,314 B2* | 6/2021 | Takano .................. H01R 43/26 |
| 2015/0353280 A1* | 12/2015 | Brazeau ............... G05D 1/0234 |
| | | 700/214 |
| 2015/0353282 A1* | 12/2015 | Mansfield ............ B65G 1/0492 |
| | | 700/214 |
| 2019/0270472 A1* | 9/2019 | Akamatsu ............. B62B 5/0079 |

FOREIGN PATENT DOCUMENTS

| JP | H05112238 A | 5/1993 |
| JP | 2018-024415 A | 2/2018 |

* cited by examiner

*Primary Examiner* — Yolanda R Cumbess
(74) *Attorney, Agent, or Firm* — ScienBiziP, P.C.

(57) ABSTRACT

The carriage is coupled to the traveling device including a driving wheel and is towed and moved by the traveling device. The carriage includes: a traveling wheel provided in a bottom portion of the carriage; an accommodating part for accommodating the traveling device; and a passage which is provided on a side surface of the carriage and through which light emitted from a detector passes, the detector being provided in the traveling device to detect an obstacle around the traveling device.

9 Claims, 23 Drawing Sheets

CARRIAGE AND TRANSPORT SYSTEM

INCORPORATION BY REFERENCE

This application is based upon and claims the benefit of priority from the corresponding Japanese Patent Application No. 2019-002962 filed on Jan. 10, 2019, the entire contents of which are incorporated herein by reference.

BACKGROUND OF INVENTION

Field of the Invention

The present disclosure relates to a carriage towed by a traveling device capable of autonomous travel, and a transport system including the traveling device and the carriage.

Description of the Background Art

An autonomous travel robot (a transport system) that includes: a traveling device having a drive device and a wheel; and a carriage coupled to the traveling device and that travels autonomously while the traveling device tows the carriage has been known. In the transport system, the traveling device is accommodated in a manner to crawl under the carriage and coupled to the carriage. The traveling device moves while towing the carriage.

In the transport system, the traveling device is provided with a detector that detects an obstacle. The detector, for example, emits search light over a predetermined angle and detects reflected light, so as to detect presence or absence of the obstacle and measure a distance to the obstacle. However, in the conventional transport system, since the carriage is arranged above the traveling device, search light is blocked by the carriage, which causes a problem of degraded detection accuracy of the obstacle.

SUMMARY OF THE INVENTION

The present disclosure has a purpose of providing a carriage and a transport system capable of preventing obstacle detection accuracy of a detector provided in a traveling device from being degraded.

A carriage according to an aspect of the present disclosure is a carriage that is towed and moved by a traveling device including a driving wheel, and includes: a traveling wheel provided in the carriage; a coupling part coupled to the traveling device; and a passage which is provided on a side surface of the carriage and through which light emitted from a detector passes, the detector being provided in the traveling device to detect an obstacle around the traveling device.

A transport system according to another aspect of the present disclosure is a transport system that includes a carriage and a traveling device traveling while towing the carriage. The detector is arranged on an advancing direction side of the traveling device and an opposite side of the advancing direction. The two detectors are arranged at positions, heights of which from a floor surface differ from each other. On the side surface, the recesses are provided at positions in different heights from each other so as to correspond to the two detectors.

The present disclosure can provide the carriage and the transport system capable of preventing the obstacle detection accuracy of the detector provided in the traveling device from being degraded.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DESCRIPTION OF THE PREFERRED EMBODIMENTS

A description will hereinafter be made on an embodiment of the present disclosure with reference to the accompanying drawings. The following embodiment is an example that embodies the present disclosure and has a character of not limiting the technical scope of the present disclosure.

Transport System 10

Figure 1:
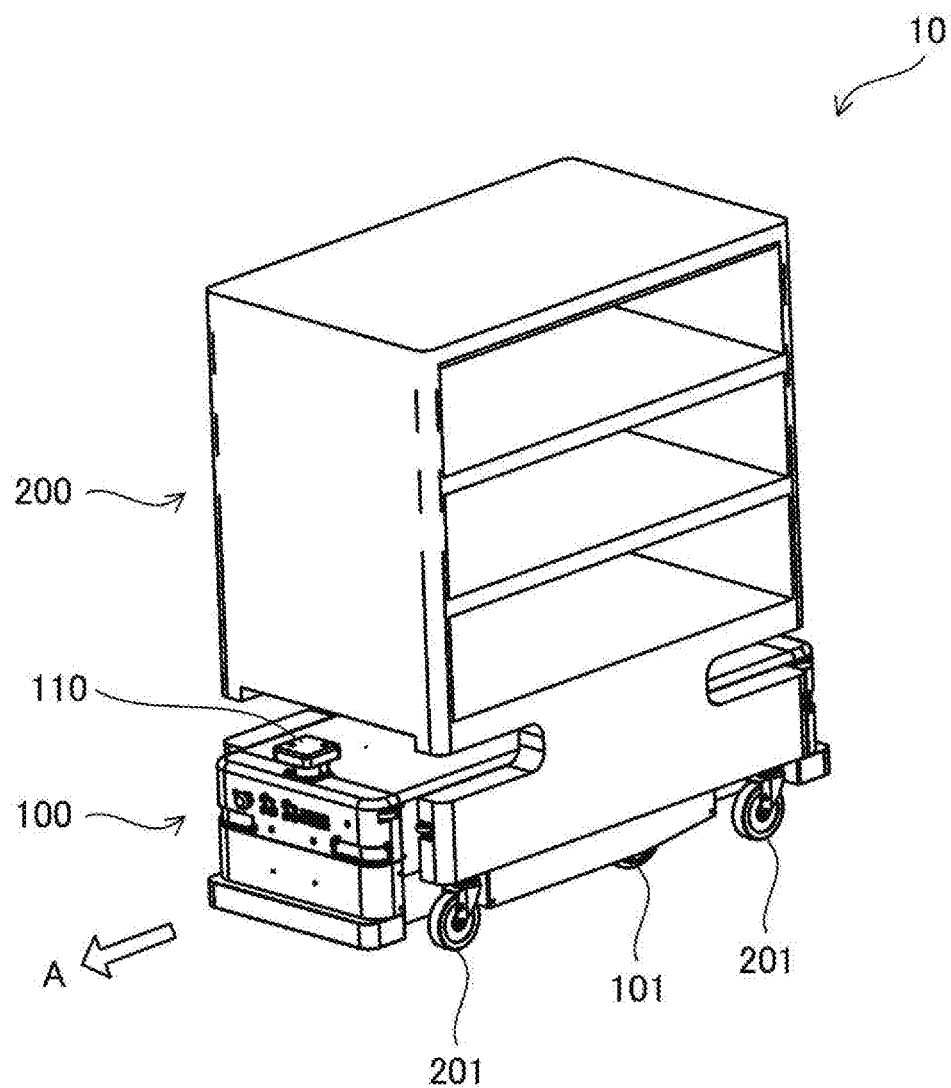
FIG. 1 is a perspective view illustrating an overall configuration of a transport system according to an embodiment of the present disclosure.
Figure 2:
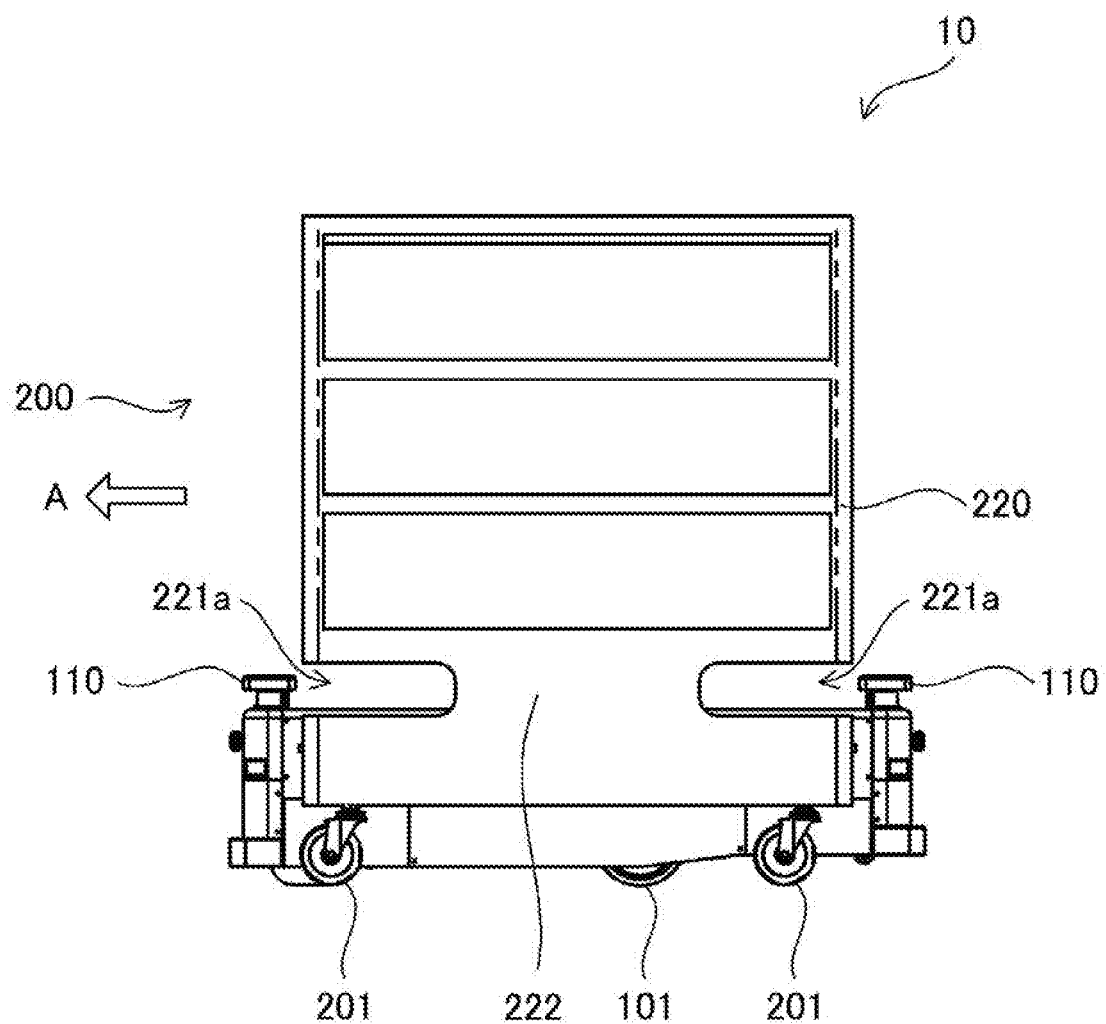
FIG. 2 is a side view illustrating the overall configuration of the transport system according to the embodiment of the present disclosure.
Figure 3:
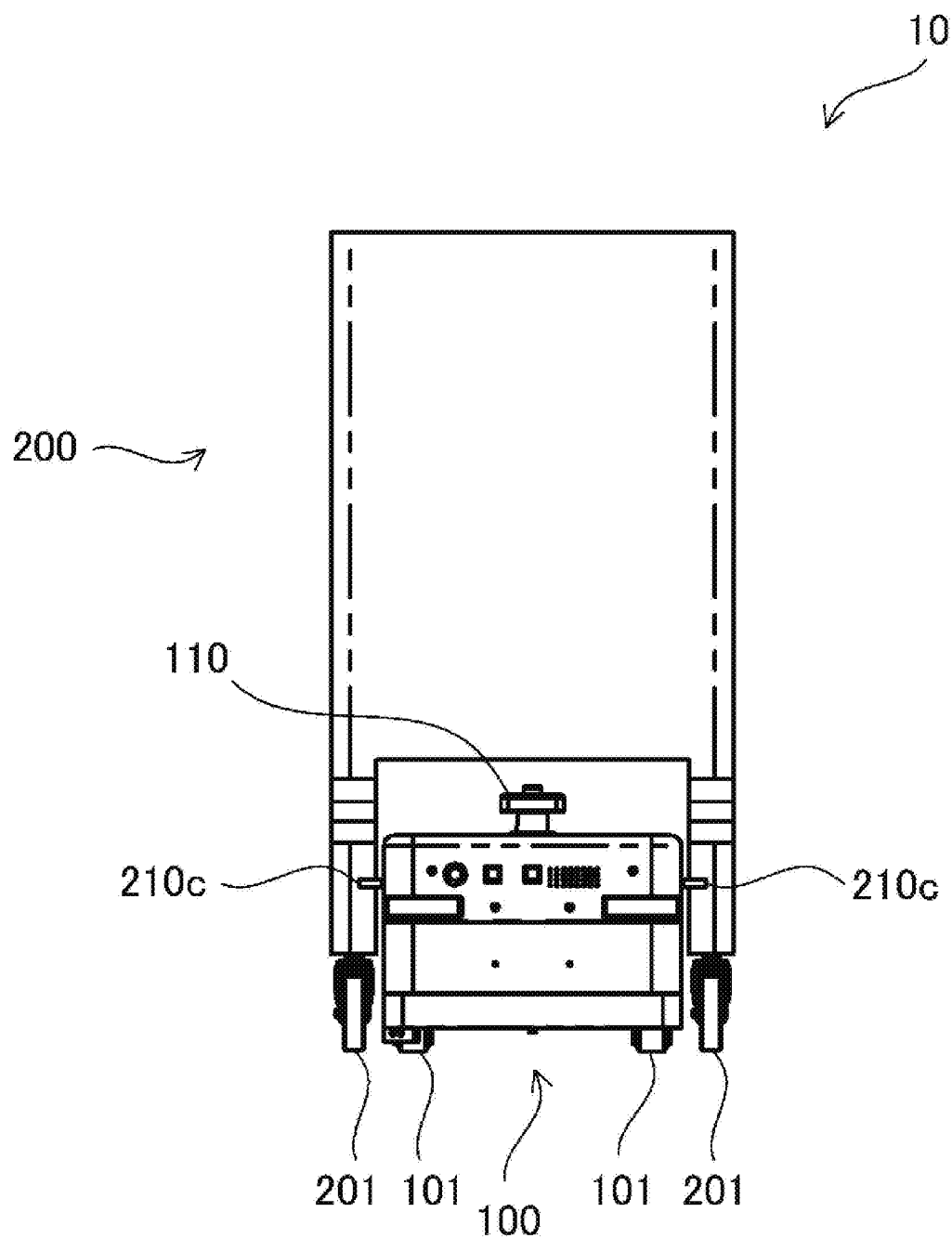
FIG. 3 is a front view illustrating the overall configuration of the transport system according to the embodiment of the present disclosure.

FIG. 1 is a perspective view illustrating an overall configuration of a transport system 10 according to an embodiment of the present disclosure. FIG. 2 is a side view illustrating the overall configuration of the transport system 10. FIG. 3 is a front view illustrating the overall configuration of the transport system 10.

The transport system 10 includes a traveling device 100, a carriage 200, a controller (not illustrated) for controlling driving of the traveling device 100, a storage (not illustrated) for storing various control programs and data, and the like. The transport system 10 is an automatic guided vehicle, for example. The traveling device 100 is inserted in an accommodating part 250 (see FIG. 7) under the carriage 200 including a traveling wheel 201, and is coupled to a coupling part (not illustrated) of the carriage 200. Then, the traveling device 100 drives the driving wheel 101, so as to autonomously move to a target location while towing the carriage 200. The transport system 10 may have functions of managing a location, a quantity, weight, or the like of a package to be transported and executing operation control. Such functions may be provided in a management device (not illustrated) that manages the transport system 10, or in an operation terminal (not illustrated) capable of remote operation of the transport system 10.

The transport system 10 may also include an operation display (not illustrated) that can be operated by a worker. The operation display is constructed of a touch panel including: an operation device for operating the transport system 10; and a display that presents any of various setting screens and the like. The operation display accepts various types of operations from the worker. For example, the operation display accepts an operation to initiate automated travel, an operation for manual travel of the transport system 10 by specifying a travel speed and a travel direction (an advancing direction), an operation to instruct charging of a battery, an operation to set (reserve, edit, or the like) a travel route. In addition, the operation display presents various screens such as an operation screen for accepting the operation, a travel display screen for a travel situation of the transport system 10, the setting screen for setting the travel route and the like.

Traveling Device 100

Figure 4:
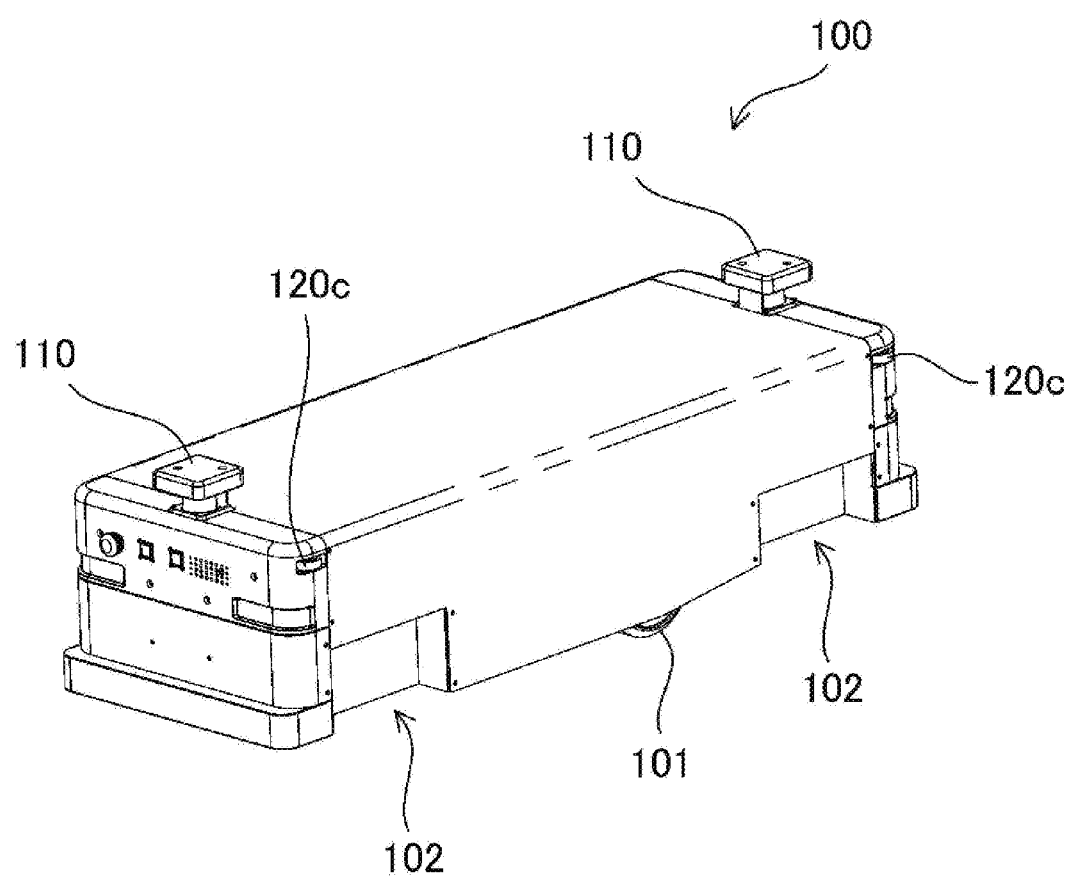
FIG. 4 is a perspective view illustrating an overall configuration of a traveling device according to the embodiment of the present disclosure.

FIG. 4 is a perspective view illustrating a specific configuration of the traveling device 100. The traveling device 100 includes: the driving wheel 101 provided in a bottom portion of a device body; and a driven wheel (not illustrated) provided in the bottom portion of the device body in a freely rotatable manner; a distance measurement device 110 that detects an obstacle around the transport system 10; a battery (not illustrated) that supplies power to the device body. The distance measurement device 110 is an example of the detector in the present disclosure.

Here, the storage is a non-volatile storage including semiconductor memory, a hard disk drive (HDD), solid state drive (SSD), or the like. For example, the storage stores the control programs including a program that causes the controller to perform travel processing.

The storage also stores picking information. The picking information is information on a location and a storage rack where each of the packages to be transported is placed, on the quantity of the packages to be transported among those packages, and on a destination where each of the packages is transported. The storage further stores package information on each of the packages. The package information is information on the quantity of the packages stored in the storage shelves and on weight, a volume, and the like of each of the packages.

The storage also stores information necessary for the travel of the transport system 10. For example, the storage stores route information on the travel route on which the transport system 10 travels. For example, the travel route corresponds to a route on which a magnetic tape adheres to a floor surface where the transport system 10 travels, or a route that is set (reserved) by the worker.

The control program is recorded in a non-temporarily manner in a computer-readable recording medium such as universal serial bus (USB), a compact disc (CD), or a digital versatile disc (DVD), is read by a reader (not illustrated) such as a USB drive, a CD drive, or a DVD drive provided in the transport system 10, and is stored in the storage. Alternatively, the control program may be downloaded from external equipment via a communication network and stored in the storage.

The controller has a control unit such as a central processing unit (CPU), read-only memory (ROM), or random-access memory (RAM). The CPU is a processor that executes various types of arithmetic processing. The ROM is a non-volatile storage that stores in advance the control programs, such as a basic input/output system (BIOS) and an operating system (OS), for making, the CPU executes the various types of the arithmetic processing. The RAM is a volatile or non-volatile storage that stores various types of the information, and is used as temporarily memory (a work region) for various types of processing executed by the CPU. The controller makes the CPU executes the various types of the control programs, which are stored in the ROM or the storage in advance, so as to control the transport system 10.

More specifically, the controller acquires operation information that corresponds to an operation performed by the worker on the operation display. In addition, the controller switches a travel mode of the transport system 10 on the basis of the operation information. More specifically, in the case where the worker performs the operation to initiate the automated travel on the operation display, the controller sets the travel mode of the transport system 10 to an automated travel mode. Meanwhile, in the case where the operator performs an operation to terminate the automated travel or an operation to initiate the manual travel, the controller sets the travel mode of the transport system 10 to a manual travel mode.

The controller controls travel operation of the transport system 10 on the basis of the travel mode. For example, in the case where the travel mode is set to the automated travel mode, the controller causes the transport system 10 to travel on the travel route that corresponds to the route information stores in the storage. More specifically, the controller transmits a travel instruction corresponding to the travel route to the traveling device 100.

In the case where the travel mode is set to the manual travel mode, the controller causes the transport system 10 to travel on the basis of the worker's operation on the operation display or the operation terminal (not illustrated). For example, the controller transmits a travel instruction corresponding to the worker's operation on the operation terminal to the traveling device 100.

The controller notifies the operation display or the like of information on a current situation of the transport system 10 such as the travel situation. For example, the controller presents, on the operation display, information on a current travel plan and a travel position (a current travel position) of the transport system 10.

The controller controls the advancing direction of the transport system 10 on the basis of information on a distance measured by the distance measurement device 110. For example, in the case where the distance measurement device 110 detects the obstacle in the advancing direction of the transport system 10, the controller changes the advancing direction such that the transport system 10 avoids the obstacle.

The distance measurement device 110 emits search light, over a predetermined angle in a horizontal direction and detects reflected light thereof, so as to detect presence or absence of the obstacle (a target) and measure a distance to the obstacle. For example, the search light is a laser beam. For example, the two distance measurement devices 110 are installed at an end on an advancing direction (front) side of the transport system 10 and at an end on an opposite (rear) side from the advancing direction. Each of the distance measurement devices 110 is arranged at a center position in a width direction when the traveling device 100 is viewed from the front (see FIG. 3). The number of the distance measurement devices 110 is not limited, and at least one of the distance measurement devices 110 may be installed. In this embodiment, each of the front distance measurement device 110 and the rear distance measurement device 110 (see FIG. 2) emits the search light within a 270-degree range so as to detect the obstacle in an emission range. Just as described, in this embodiment, it is possible to detect the obstacle that exists within a predetermined range around the transport system 10 by using the two distance measurement devices 110.

When the traveling device 100 is viewed from above, the two distance measurement devices 110 may be arranged on diagonal lines, each of which passes corners and a center of the traveling device 100, or may be arranged on a center side such that a distance therebetween is reduced when compared to a distance between positions illustrated in FIG. 3 and FIG. 4. In addition, each of the distance measurement device 110 may be arranged on an upper surface of the traveling device 100 or may be arranged in a region between a bottom surface and the upper surface of the traveling device 100.

The traveling device 100 includes a guide roller 120c (corresponding to the first guide roller in the present disclosure) on at least one of the corner and a side surface of the traveling device 100. The guide roller 120c can come into contact with the carriage 200 when the traveling device 100 is inserted in the accommodating part 250 under the carriage 200. In an example illustrated in FIG. 4, the guide rollers 120c are provided at the four corners of the traveling device 100. The guide roller 120c is formed of free wheels that can rotate in the horizontal direction when a roller shaft extending in a perpendicular direction to the floor surface is supported by a casing of the traveling device 100. An outer periphery of the guide roller 120c is covered with an elastic member such as rubber. Thus, it is possible to prevent damage to a contact target (for example, the carriage 200) contacted by the guide roller 120c.

Moreover, the traveling device 100 includes a recess 102, which will be described later, on the side surface. The recess 102 is provided at a position that corresponds to the traveling wheel 201 of the carriage 200.

Figure 5:
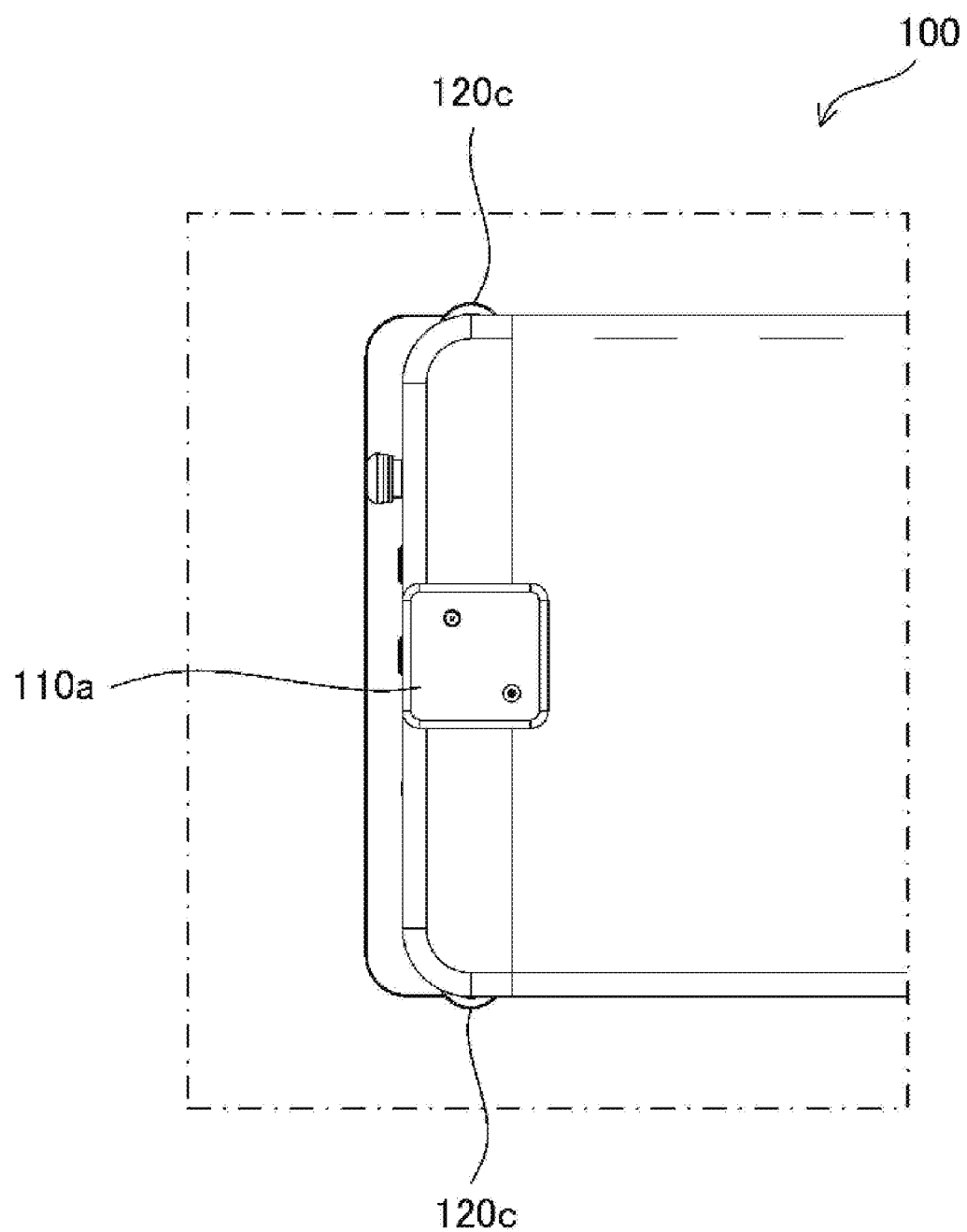
FIG. 5 is a plan view in which a portion of the traveling device according to the embodiment of the present disclosure is enlarged.

FIG. 5 is a plan view of the traveling device 100 as viewed from above. The guide roller 120c is provided such that a portion thereof is projected outward from the corner and the side surface of the traveling device 100 (the side surface that is located laterally with respect to the advancing direction of the traveling device 100), and is also provided such that, before the side surface (the casing) of the traveling device 100 comes into contact with the contact target (for example, the carriage 200), the guide roller 120c comes into contact with the contact target.

The traveling device 100 may further include one or more guide rollers 120s (corresponding to the first guide roller in the present disclosure) on each of the side surfaces. In other words, the guide rollers of the traveling device 100 may be arranged on the four corners and both of the side surfaces. For example, on the side surface, the multiple guide rollers 120s may be arranged at equally-spaced intervals or at different intervals. For example, in an example illustrated in FIG. 6A, the multiple guide rollers 120s are arranged such that a distance between the two adjacent guide rollers 120s is reduced as closer to an insertion opening (an accommodation opening) of the accommodating part 250 (see FIG. 7) in the carriage 200 that is, as closer to an end of the traveling device 100. In other words, in FIG. 6A, the multiple guide rollers 120s are arranged in a manner to satisfy a relational expression of a distance L1<a distance L2<a distance L3. Here, the distance L1 represents a distance from the guide roller 120c at the corner to the guide roller 120s on the side surface.

The multiple guide rollers 120s may have the same projection length from the side surface or different projection lengths therefrom. For example, in an example shown in FIG. 6B, when the traveling device 100 is viewed from above, the multiple guide rollers 120s are arranged such that the projection length of the guide roller 120s from the side surface is reduced as closer to the insertion opening of the accommodating part 250 in the carriage 200, that is, as closer to the end of the traveling device 100. That is, in FIG. 6B, the multiple guide rollers 120s are arranged in a manner to satisfy a relational expression of a length D1<a length D2<a length D3<a length D4. Here, the length D1 represents the projection length of the guide roller 120c at the corner from the side surface.

The guide rollers 120c and the multiple guide rollers 120s are arranged at positions, a height of each of which from the floor surface is the same. In this way, for example, when the traveling device 100 is inserted in the accommodating part 250 of the carriage 200, a position where the guide roller 120c contacts the carriage 200 can match a position where the guide roller 120s contacts the carriage 200.

Figure 6A:
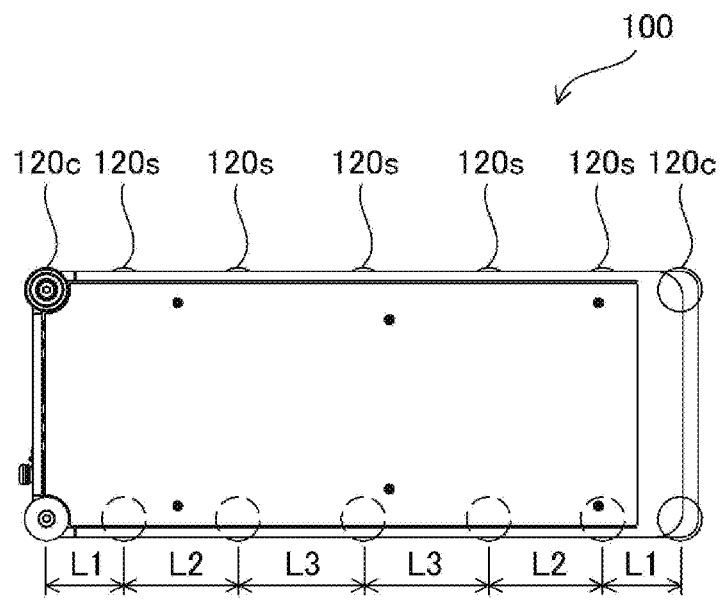
FIG. 6A is a plan view illustrating a configuration of a guide roller in the traveling device according to the embodiment of the present disclosure.
Figure 6B:
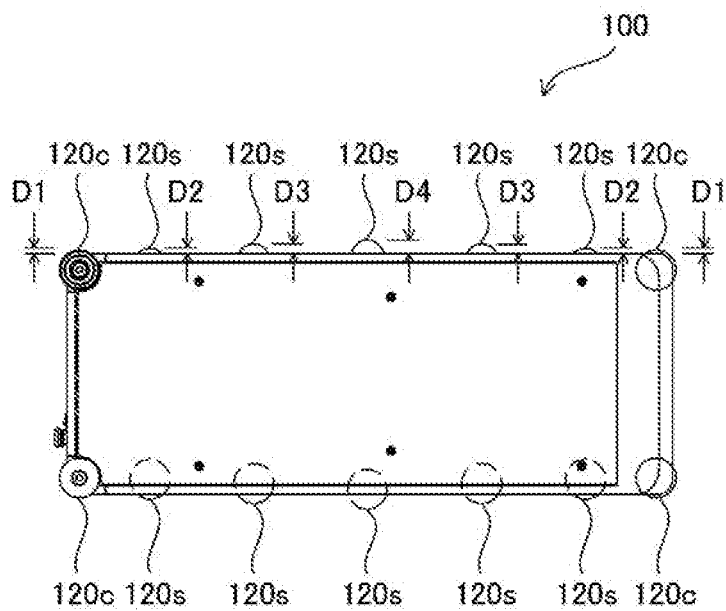
FIG. 6B is a plan view illustrating the configuration of the guide roller in the traveling device according to the embodiment of the present disclosure.

The configuration illustrated in FIG. 6A and FIG. 6B is a configuration that the traveling device 100 can be inserted in the carriage 200 from both directions. More specifically, such a configuration is illustrated that the traveling device 100 can be accommodated in the accommodating part 250 of the carriage 200 when the carriage 200 moves from a left side of the traveling device 100 illustrated in FIG. 6A and FIG. 6B, and that the traveling device 100 can be accommodated in the accommodating part 250 of the carriage 200 when the carriage 200 moves from a right side of the traveling device 100.

The traveling device 100 also includes a stopper (not illustrated) for coupling to the carriage 200. The stopper is provided on the upper surface of the traveling device 100, for example. In the case where the traveling device 100 is inserted in the accommodating part 250 of the carriage 200, the stopper is engaged with the coupling part of the carriage 200. In this way, the traveling device 100 and the carriage 200 are coupled to each other.

Carriage 200

Figure 7:
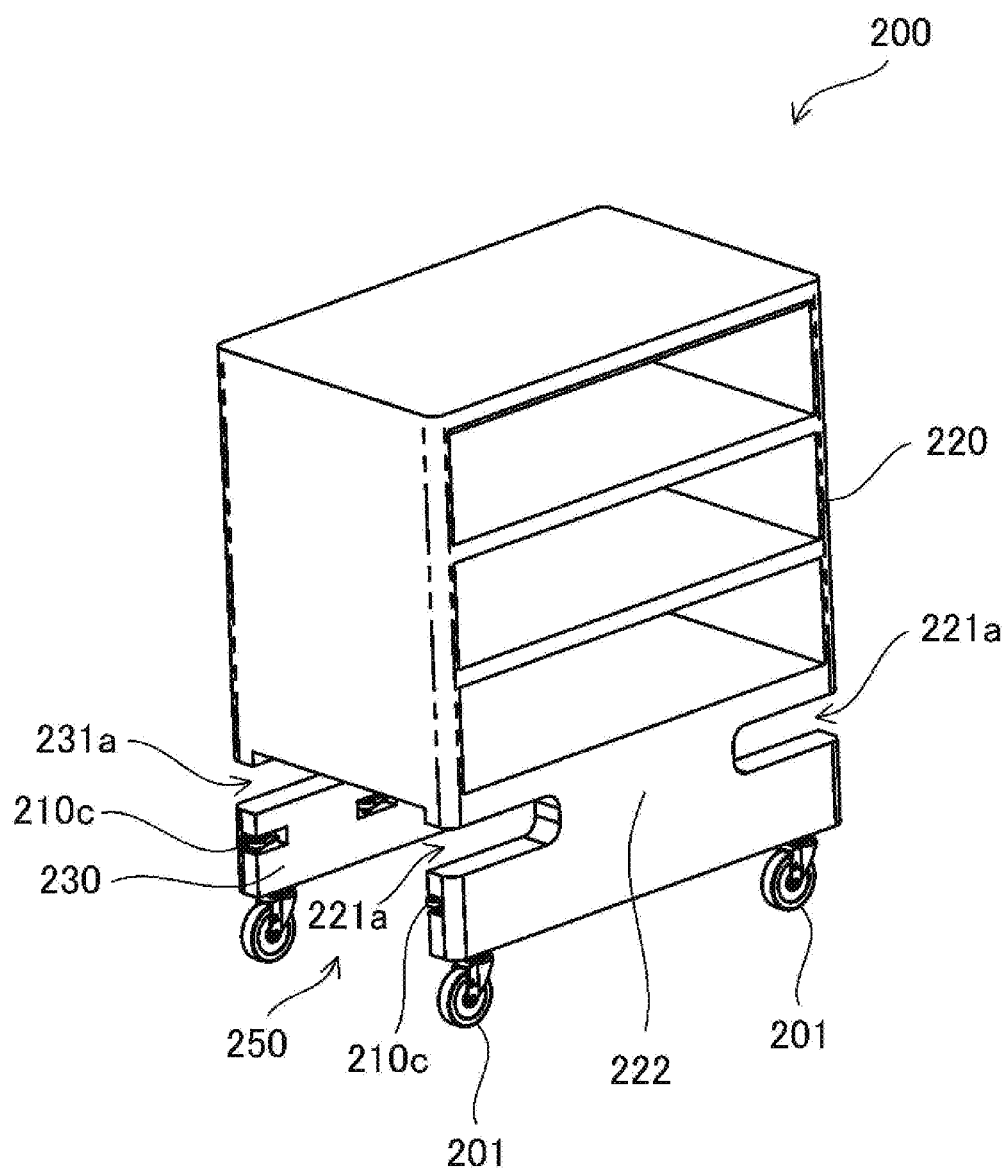
FIG. 7 is a perspective view illustrating an overall configuration of a carriage according to the embodiment of the present disclosure.

FIG. 7 is a perspective view illustrating a specific configuration a the carriage 200. The carriage 200 is a rack (a wagon) on which the package or the like is placed, and includes the traveling wheel 201 that is attached to a bottom portion at four corners of the carriage 200 in the freely rotatable manner. The carriage 200 is configured that the carriage 200 can be self-supported by the tour traveling wheels 201 and can be moved manually by the worker.

The carriage 200 includes two side surfaces 220 positioned laterally with respect to an insertion direction in which the traveling device 100 is inserted in the accommodating part 250 under the carriage 200. An opening through which the package is placed or removed is provided above each of the side surfaces 220, and a recess 221a (an example of the passage in the present disclosure), through which the search light from the distance measurement device 110 passes, is provided under each of the side surfaces 220. Each of the side surfaces 220 includes: the recess 221a on a side of an advancing direction A, the recess 221a on an opposite side of the advancing direction A, and a coupling part 222 (an example of the vertical coupling part in the present disclosure) arranged between the two recesses 221a. In this way, each of the side surfaces 220 is configured to include: a storage space (the rack) above the recesses 221a; legs under the recesses 221a; and the coupling part 222 that is adjacent to each of the recesses 221a and couples the storage space to the legs. In the side surface 220, each of the recesses 221a is provided at a height where the recess 221a is irradiated with the search light. In addition, each of the recesses 221a has a notched shape from an end of the side surface 220.

A guide roller 210c (corresponding to the second guide roller in the present disclosure) is provided in a portion (the leg) under the recess 221a and the coupling part 222 in the side surface 220. More specifically, the guide roller 210c is provided on an inner surface 230 of the leg of the carriage 200, in which the traveling device 100 is inserted, such that the guide roller 210c can contact the traveling device 100. For example, the guide roller 210c is arranged at a corner of the insertion opening, from which the traveling device 100 is inserted. In the case where it is configured that the traveling device 100 is inserted in the carriage 200 from one direction, the guide roller 210c is arranged at the two corners of one of the insertion openings. Meanwhile, in the case where it is configured that the traveling device 100 can be inserted in the carriage 200 from both of the directions (the front and the rear), the guide roller 210c is arranged at the four corners of both of the (front and rear) insertion openings.

The traveling wheel 201 is provided at the corner of the bottom portion of each of the side surfaces 220. All of the four traveling wheels 201 may be formed of turnable wheels (turning casters). Alternatively, while two of the traveling wheels 201 may be formed of the turning casters, the other two of the traveling wheels 201 may be formed of wheels incapable of turning (fixed casters).

The accommodating part 250 (see FIG. 7) is a predetermined space in which the traveling device 100 can be inserted is formed under the carriage 200. The accommodating part 250 is a space that is covered with the legs and the storage space. For example, the worker pushes and moves the carriage 200 by hand to accommodate the traveling device 100 in a stop state on the floor surface in the accommodating part 250 of the carriage 200. Then, when the stopper provided on the upper surface of the traveling device 100 is engaged with the coupling part of the carriage 200, the traveling device 100 is coupled to the carriage 200. Thereafter, by driving the traveling device 100, the carriage 200 is towed by the traveling device 100 and moved to the target location.

Figure 8:
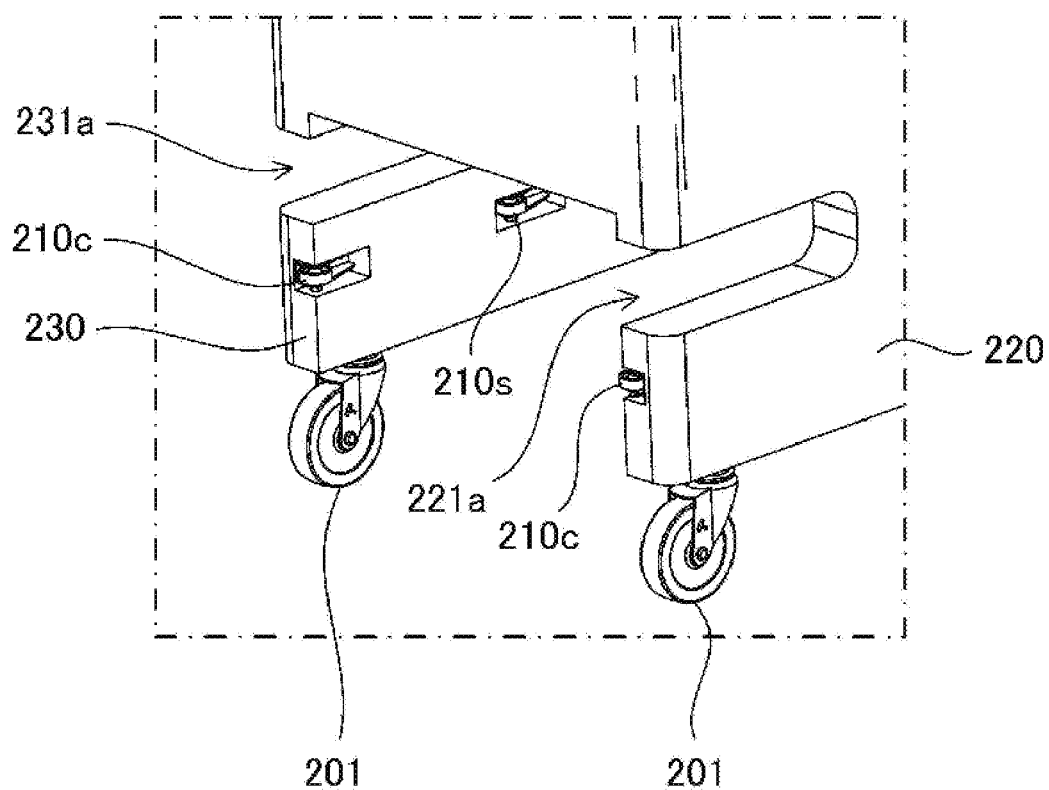
FIG. 8 is a perspective view in which a portion of the carriage according to the embodiment of the present disclosure is enlarged.
Figure 9:
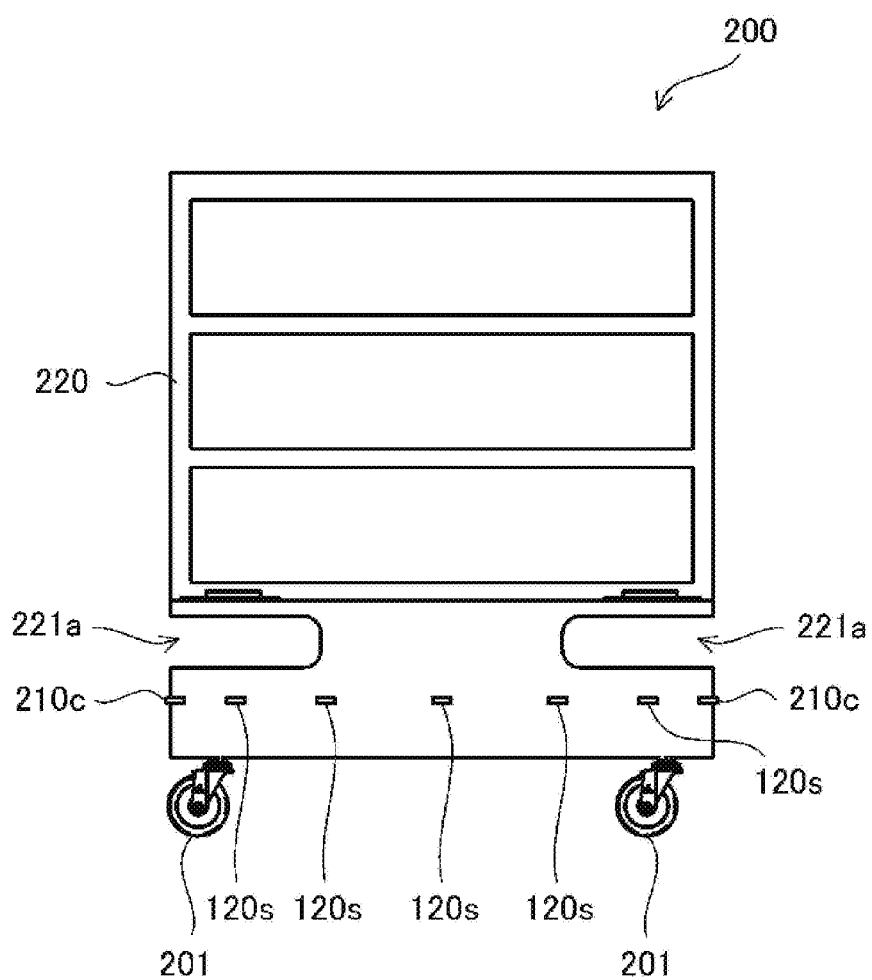
FIG. 9 is a side view illustrating the overall configuration of the carriage according to the embodiment of the present disclosure.

The carriage 200 may further include one or more guide rollers 210s (corresponding to the second guide roller in the present disclosure) on the inner surface 230 of the accommodating part 250 (see FIG. 8 and FIG. 9). For example, on the inner surface 230, the multiple guide rollers 210s may be arranged at equally-spaced intervals or at different intervals. For example, in an example illustrated in FIG. 10A, the multiple guide rollers 210s are arranged such that a distance between the two adjacent guide rollers 210s is reduced as closer to the insertion opening of the accommodating part 250 in the carriage 200, that is, as closer to an end of the carriage 200. In other words, in FIG. 10A, the multiple guide rollers 210s are arranged in a manner to satisfy a relational expression of a distance P1<a distance P2<a distance P3. Here, the distance P1 represents a distance from the guide roller 210c at the corner to the guide roller 210s on the inner surface 230.

The multiple guide rollers 210s may have the same projection length from the inner surface 230 or different projection lengths therefrom. For example, in an example illustrated in FIG. 10B, when the carriage 200 is viewed from above, the multiple guide rollers 210s are arranged such that the projection length of the guide roller 210s from the inner surface 230 is reduced as closer to the insertion opening of the accommodating part 250 in the carriage 200, that is, as closer to the end of the carriage 200. That is, in FIG. 10B, the multiple guide rollers 210s are arranged in a manner to satisfy a relational expression of a length d1<a length d2<a length d3<a length d4. Here, the length d1 represents the projection length of the guide roller 210c at the corner from the corner and the inner surface 230.

The guide rollers 210c and the guide rollers 210s are arranged at positions, a height of each of which from the floor surface is the same. In this way, for example, when the traveling device 100 is inserted in the accommodating part 250 of the carriage 200, a position where the guide roller 210c contacts the traveling device 100 can match a position where the guide rollers 210s contacts the traveling device 100.

Figure 10A:
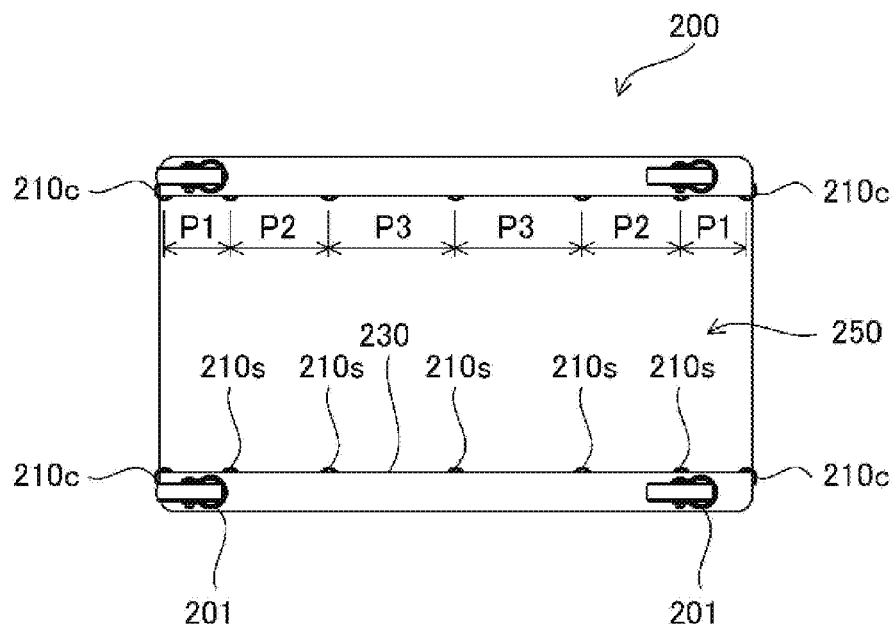
FIG. 10A is a plan view illustrating a configuration of a guide roller in the carriage according to the embodiment of the present disclosure.
Figure 10B:
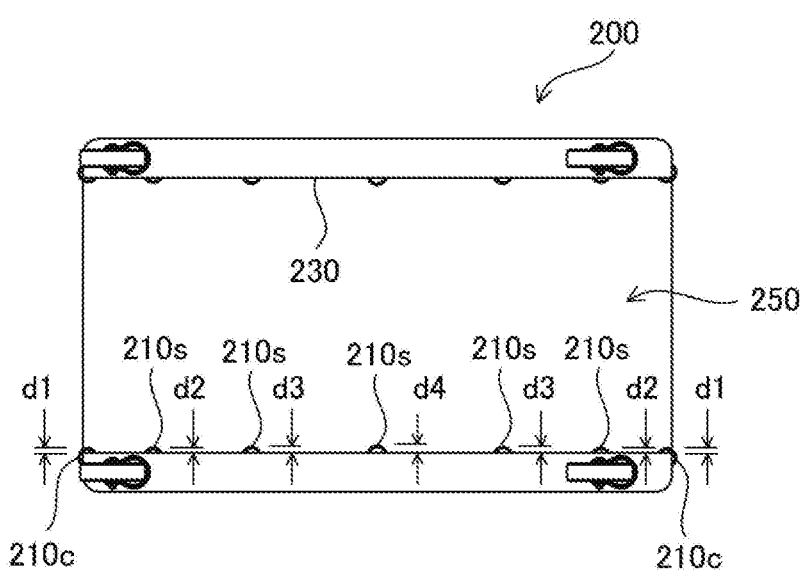
FIG. 10B is a plan view illustrating the configuration of the guide roller in the carriage according to the embodiment of the present disclosure.

The configuration illustrated in FIG. 10A and FIG. 10B is a configuration that the traveling device 100 can be inserted in the carriage 200 from both of the directions. More specifically, such a configuration is illustrated that the traveling device 100 can be accommodated in the accommodating part 250 of the carriage 200 when the carriage 200 illustrated in FIG. 10A and FIG. 10B moves leftward, and that the traveling device 100 can be accommodated in the accommodating part 250 of the carriage 200 when the carriage 200 moves rightward.

Figure 11:
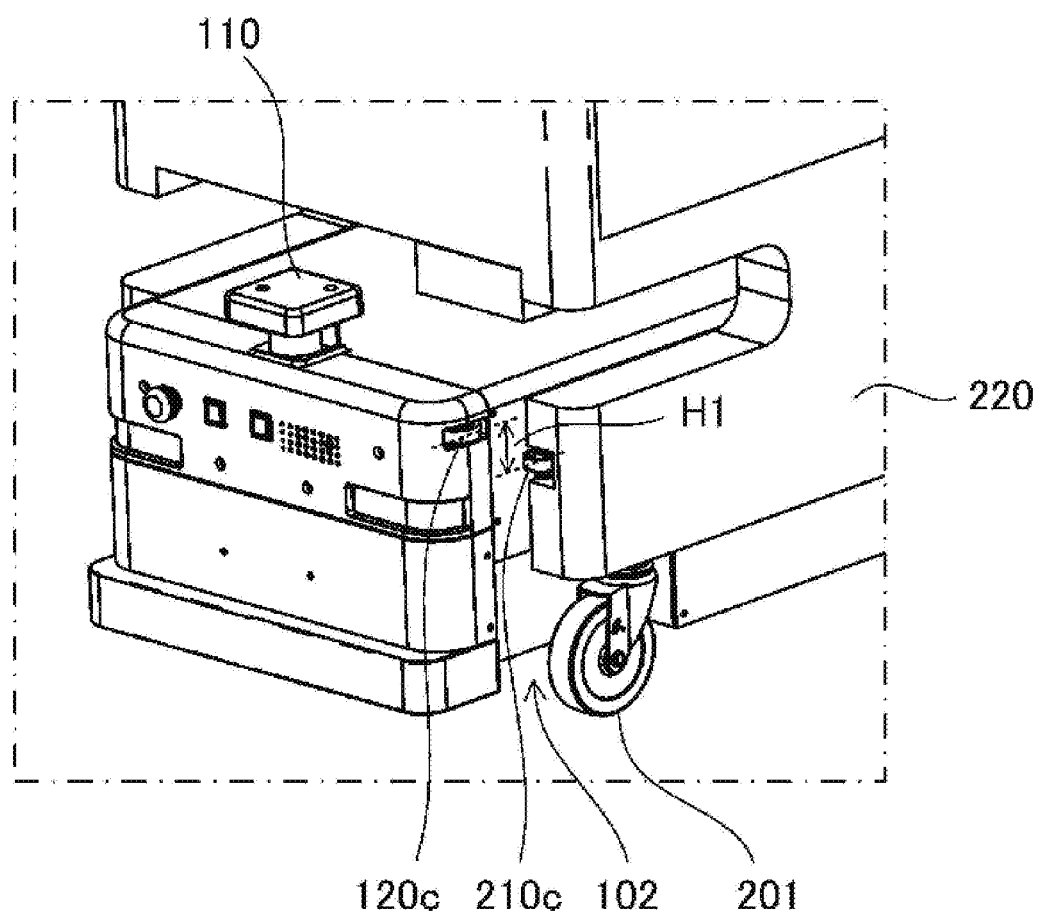
FIG. 11 is a perspective view in which a portion of the transport system according to the embodiment of the present disclosure is enlarged.

In addition, as illustrated in FIG. 11, the guide roller 210c and the guide roller 210s of the carriage 200 are arranged at positions, a height of each of which from the floor surface differs from the height of each of the guide roller 120c and the guide roller 120s in the traveling device 100 therefrom. For example, as illustrated in FIG. 11, the guide roller 210c and the guide roller 120c are arranged in different heights from the floor surface by H1. In this way, the guide roller 210c and the guide roller 120c do not contact each other, the guide roller 210c can contact the traveling device 100, and the guide roller 120c can contact the carriage 200.

Coupling Method

Figure 12A:
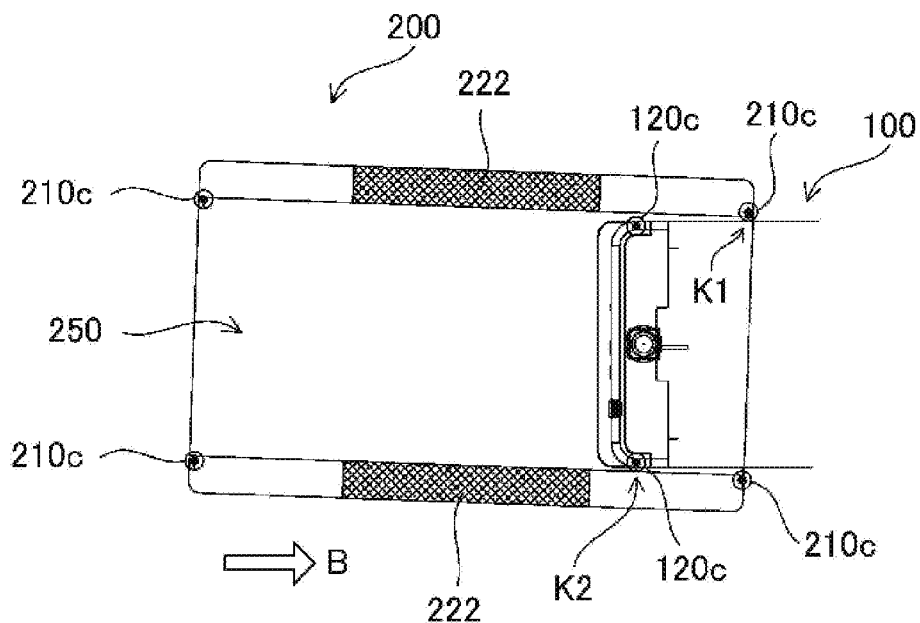
FIG. 12A is a plan view illustrating a method for coupling the traveling device and the carriage according to the embodiment of the present disclosure.
Figure 12B:
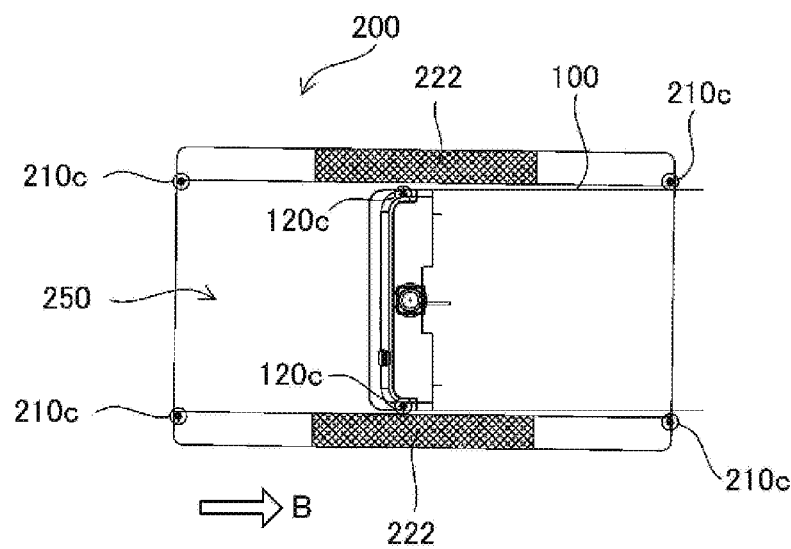
FIG. 12B is a plan view illustrating the method for coupling the traveling device and the carriage according to the embodiment of the present disclosure.
Figure 12C:
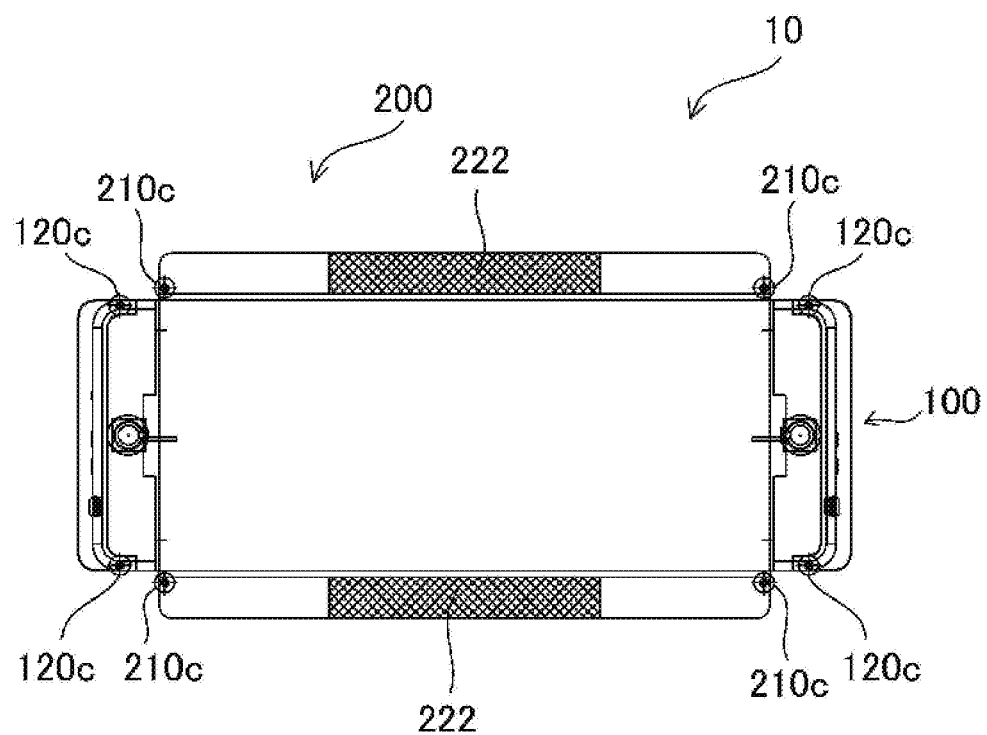
FIG. 12C is a plan view illustrating the method for coupling the traveling device and the carriage according to the embodiment of the present disclosure.

FIG. 12A to FIG. 12C are views illustrating a procedure of a method for coupling the traveling device 100 and the carriage 200. In the case where the traveling device 100 and the carriage 200 are coupled to each other, the worker pushes and moves the carriage 200 by hand to accommodate the traveling device 100 in the accommodating part 250 of the carriage 200.

More specifically, as illustrated in FIG. 12A, the worker grasps and moves a casing of the carriage 200 in a direction B, and then inserts a tip of the traveling device 100 in the stop state through the insertion opening of the accommodating part 250 in the carriage 200. When the tip of the traveling device 100 is inserted in the accommodating part 250 of the carriage 200, the guide roller 210c of the carriage 200 comes into contact with the casing (the side surface) of the traveling device 100 (K1 in FIG. 12A), and the guide roller 120c of the traveling device 100 comes into contact with the casing (the inner surface 230) of the carriage 200 (K2 in FIG. 12A). As a result, the guide roller 120c and the guide roller 210c rotate to introduce the tip of the traveling device 100 into the accommodating part 250 of the carriage 200.

Next, when the worker pushes the carriage 200 in the direction B, as illustrated in FIG. 12B, the guide roller 120c and the guide roller 210c rotate according to a pushing force by the worker, and the traveling device 100 is thereby introduced deep into the accommodating part 250 of the carriage 200. In other words, while the guide roller 210c rotates and contacts the traveling device 100 and the guide roller 120c rotates and contacts the carriage 200, the carriage 200 moves in the direction B according to the pushing force by the worker. In this way, the traveling device 100 is guided deep into the accommodating part 250.

Subsequently, when the worker further pushes the carriage 200 in the direction B, as illustrated in FIG. 12C, the carriage 200 further moves to a predetermined position (for example, the center position) with respect to the traveling device 100, and the traveling device 100 is inserted in the accommodating part 250 of the carriage 200. Once the carriage 200 is arranged at the predetermined position with respect to the traveling device 100, the guide roller 210c is brought into a state capable of contacting the side surface of the traveling device 100, and the guide roller 120c is arranged on the outside of the carriage 200. In addition, once the carriage 200 is arranged at the predetermined position with respect to the traveling device 100, the stopper of the traveling device 100 is engaged with the coupling part of the carriage 200, and thus the traveling device 100 and the carriage 200 are coupled to each other. In this way, the transport system 10 is brought into a state capable of making autonomous travel. In addition, when the traveling device 100 and the carriage 200 are coupled to each other, the guide roller 210c of the carriage 200 contacts the side surface of the traveling device 100. Thus, rattling of the carriage 200 is suppressed.

Here, in the transport system 10 of the present disclosure, it is only necessary that at least one of the traveling device 100 and the carriage 200 is provided with the guide roller. In the case where traveling device 100 is provided with the guide roller, the guide roller only needs to be provided on at least one of the corner and the side surface of the traveling device 100. Meanwhile, in the case where the carriage 200 is provided with the guide roller, the guide roller only needs to be provided on at least one of the corner and the side surface of the carriage 200. In addition, as illustrated in FIG. 12A to FIG. 12C, the guide rollers, may be provided at the four corners of the traveling device 100 and the four corners of the carriage 200.

In the transport system 10 according to this embodiment, due to the rotation of the guide roller, the traveling device 100 is smoothly inserted and accommodated in the carriage 200. Thus, the traveling device 100 and the carriage 200 can be coupled to each other without damaging each other. In addition, as illustrated in FIG. 3, the carriage 200 can be thinned by reducing a width thereof in conformity to a width of the traveling device 100. That is, the small-sized transport system 10 can be created.

At an initial stage at which the traveling device 100 starts being inserted in the carriage 200, as illustrated in FIG. 12A, the traveling device 100 is likely to be inserted obliquely with respect to the carriage 200. Thus, particularly in the vicinity of the insertion opening, the traveling device 100 and the carriage 200 are likely to contact each other. On the contrary, in the case where the traveling device 100 has the configuration illustrated in FIG. 6A or where the carriage 200 has the configuration illustrated in FIG. 10A, the guide rollers are arranged densely in the vicinity of the insertion opening. Thus, it is possible to prevent the contact between the traveling device 100 and the carriage 200 in the vicinity of the insertion opening. Alternatively, in the case where the traveling device 100 has the configuration illustrated in FIG. 6B or where the carriage 200 has the configuration illustrated in FIG. 10B, the traveling device 100 can be guided to a central side (a center side when viewed from the front) of the accommodating part 250 in the carriage 200. Thus, it is possible to prevent the contact between the traveling device 100 and the carriage 200 in the vicinity of the insertion opening.

In addition, in the transport system 10 according to this embodiment, the guide rollers are interposed between the traveling device 100 and the carriage 200. Thus, it is possible to prevent the contact between the traveling device 100 and the carriage 200 during actuation (the travel) of the transport system 10 after the traveling device 100 and the carriage 200 are coupled to each other.

The transport system 10 in the present disclosure is not limited to the above-described configuration.

Figure 13:
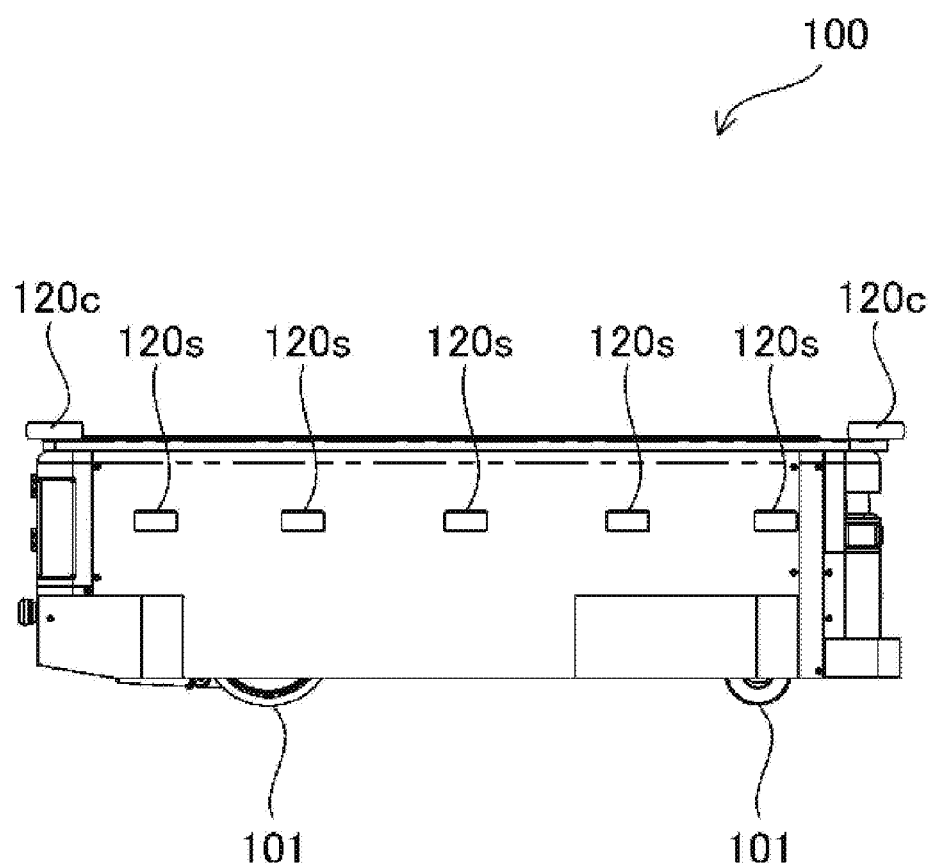
FIG. 13 is a side view illustrating another configuration of the traveling device according to the embodiment of the present disclosure.
Figure 14:
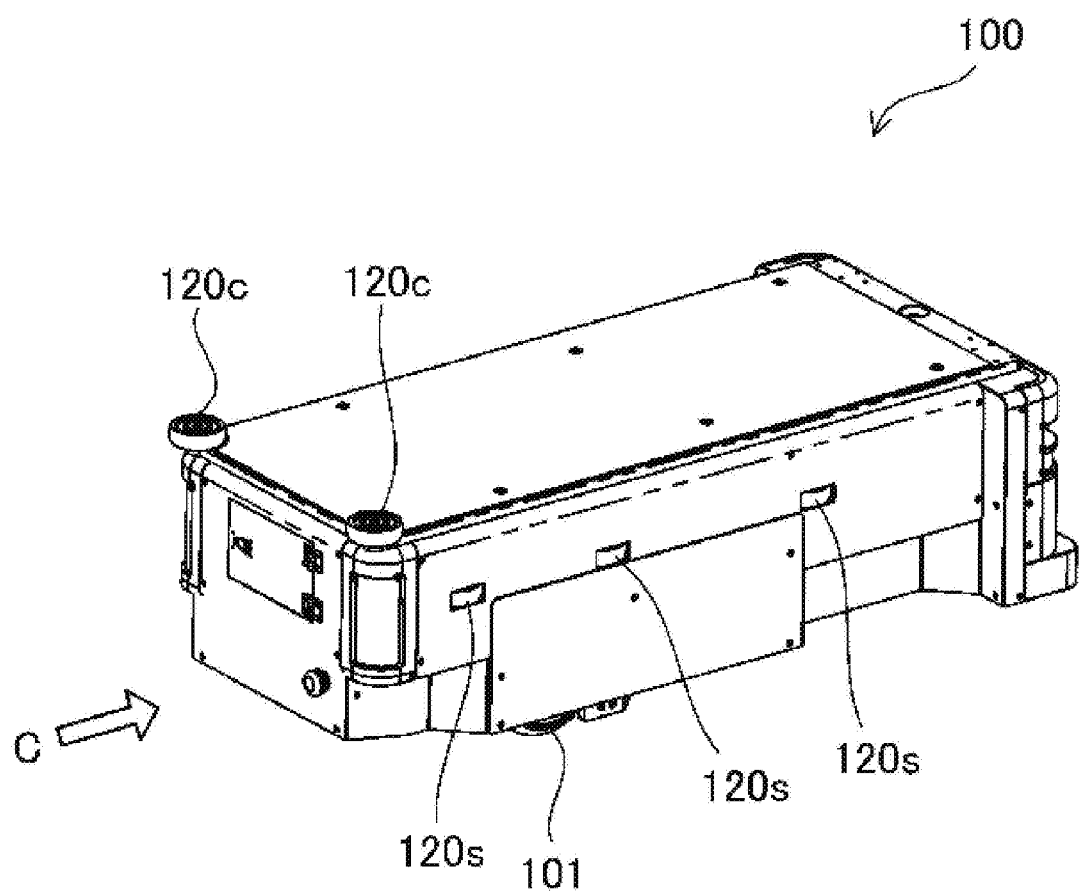
FIG. 14 is a perspective view illustrating the other configuration of the traveling device according to the embodiment of the present disclosure.

As another embodiment, for example, as illustrated in FIG. 13, in the traveling device 100, the guide roller 120c may be provided on the upper surface of the traveling device 100. In addition, the traveling device 100 may be configured that the traveling device 100 is inserted in the carriage 200 from one specific direction. For example, as illustrated in FIG. 14, the carriage 200 moves in a direction C toward the traveling device 100 and accommodates the traveling device 100 in the accommodating part 250 of the carriage 200. In this configuration, the guide rollers 120c of the traveling device 100 need to be arranged only on the insertion opening side.

In addition, in the configuration that the carriage 200 moves from the one direction and is coupled to the traveling device 100 (see FIG. 14), the multiple guide rollers 120s are arranged such that the distance between the two adjacent guide rollers 120s is reduced as closer to the insertion opening (the accommodation opening) of the accommodating part 250 in the carriage 200 (see FIG. 7), that is, as closer to a front end the traveling device 100 and that the distance between the two adjacent guide rollers 120s are increased as farther from the insertion opening, that is, as closer to a rear end of the traveling device 100. The multiple guide rollers 120s are also arranged such that the projection length of the guide roller 120s from the side surface is reduced as closer to the insertion opening (the accommodation opening) of the accommodating part 250 in the carriage 200 (see FIG. 7), that is, as closer to the front end of the device 100 and that the projection length of the guide roller 120s from the side surface is increased as farther from the insertion opening, that is, as closer to the rear end of the traveling device 100.

Similarly the multiple guide rollers 210s are arranged such that the distance between the two adjacent guide rollers 210s is reduced as closer to the insertion opening of the accommodating part 250 in the carriage 200, that is, as closer to the end of the carriage 200 and that the distance between the two adjacent guide rollers 210s is increased as farther from the insertion opening, that is, as closer to a rear end of the carriage 200. In addition, the multiple guide rollers 210s are arranged such that the projection length of the guide roller 210s from the inner surface 230 is reduced as closer to the insertion opening of the accommodating part 250 in the carriage 200, that is, as closer to the end of the carriage 200 and that the projection length of the guide roller 210s from the inner surface 230 is increased as farther from the insertion opening, that is, as closer to the rear end of the carriage 200.

Figure 15:
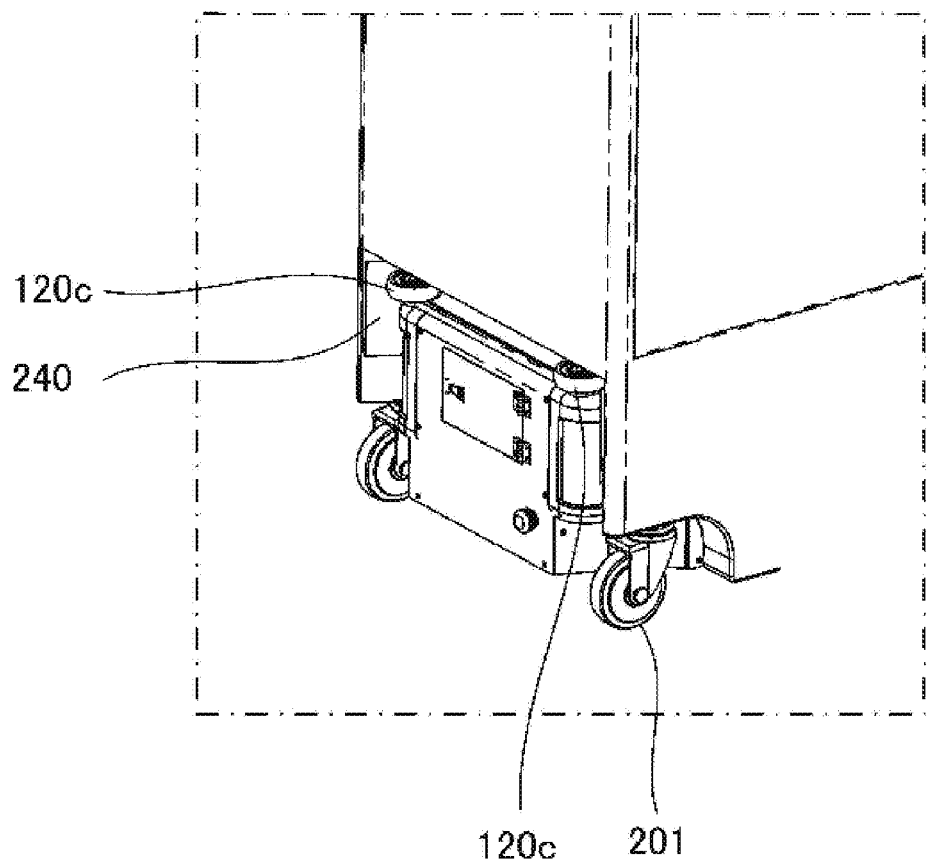
FIG. 15 is a perspective view in which a portion of another configuration of the transport system according to the embodiment of the present disclosure is enlarged.

As another embodiment, for example, as illustrated in FIG. 15, the inner surface 230 of the carriage 200 may be provided with a side plate 240 that can contact the guide roller 120c of the traveling device 100. The side plate 240 is formed of a hard material such as metal or a resin. In addition, the side plate 240 is preferably formed in a tapered shape that expands from the inside of the accommodating part 250 toward the insertion opening. As a result, the guide roller 120c rotates and contacts the side plate 240. Thus, the traveling device 100 is easily guided into the accommodating part 250 of the carriage 200, and the traveling device 100 can smoothly be inserted in the carriage 200.

Recess 221a of Carriage 200

Figure 16:
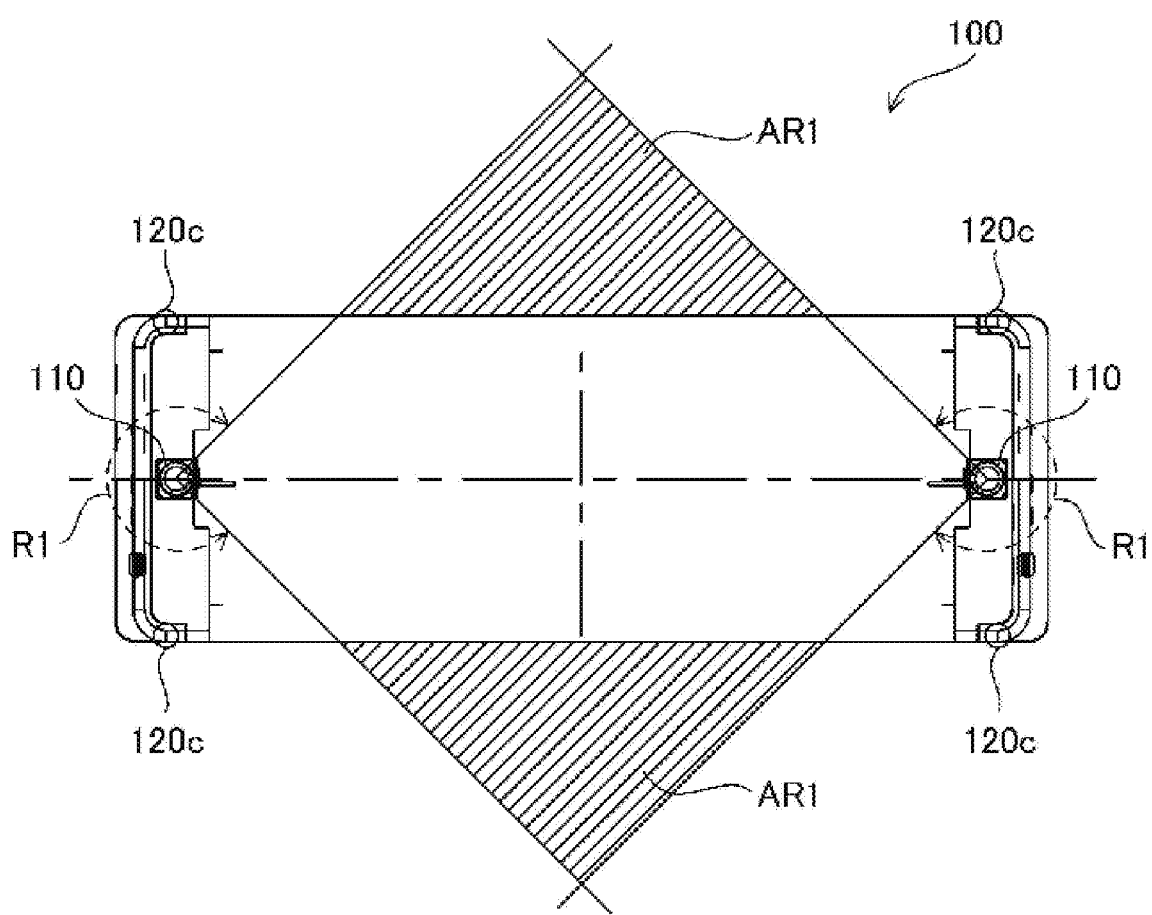
FIG. 16 is a plan view illustrating an emission range of search light by a distance measurement device according to the embodiment of the present disclosure.
Figure 17:
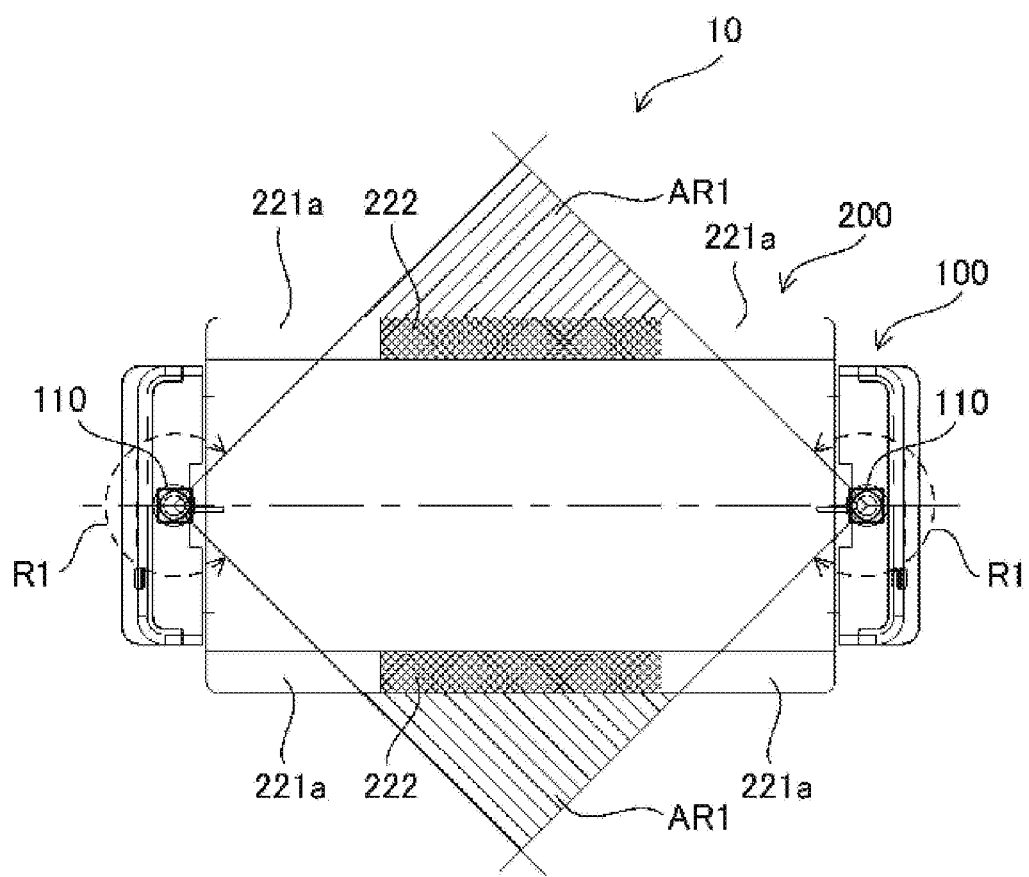
FIG. 17 is a plan view illustrating the configuration of the carriage according to the embodiment of the present disclosure.

As illustrated in FIG. 16, the distance measurement device 110 is installed at two positions on the advancing direction (front) side and the rear side of the transport system 10. Each of the distance measurement devices 110 emits the search light within the 270-degree range (R1 illustrated in FIG. 16). Thus, a range R1 illustrated in FIG. 16 serves as an irradiation region irradiated with the search light, and a range AR1 illustrated in FIG. 16 serves as a non-irradiation region not irradiated with the search light. In order to maximize a function of the irradiation region as a detection region for detecting the obstacle, as illustrated in FIG. 2, the carriage 200 includes the recess 221a. More specifically, as illustrated in FIG. 17, when the carriage 200 and the traveling device 100 are viewed from above, at least a portion of the recess 221a is arranged in the irradiation region R1 of the search light, and the coupling part 222 is arranged in the non-irradiation region AR1 of the search light. According to the above configuration, the carriage 200 does not block the search light emitted from the distance measurement device 110. Thus, it is possible to expand a detection range of the distance measurement device 110. As a result, it is possible to prevent obstacle detection accuracy of the distance measurement device 110 provided in the traveling device 100 from being degraded.

Figure 18:
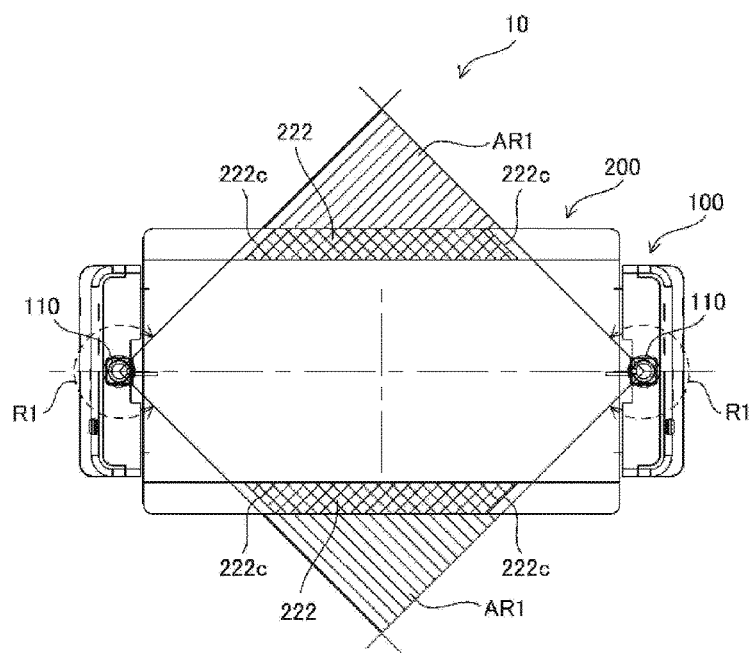
FIG. 18 is a plan view illustrating another configuration of the carriage according to the embodiment of the present disclosure.

As another embodiment of the carriage 200, for example, as illustrated in FIG. 18, an end of the coupling part 222 may have an inclined surface 222c that is inclined in an emission direction of the search light. As a result, it is possible to expand the detection range of the distance measurement device 110 and to secure strength of the coupling part 222 of the carriage 200 by increasing an area of the coupling part 222. The end of the coupling part 222 is not limited to the inclined surface but may be a curved surface.

In each of the configurations illustrated in FIG. 17 and FIG. 18, on the upper surface of the traveling device 100, the two distance measurement devices 110 may be arranged on the center side such that the distance therebetween is reduced. As a result, the non-irradiation region AR1 can be reduced, and thus the detection range of the distance measurement device 110 can further be expanded.

Figure 19:
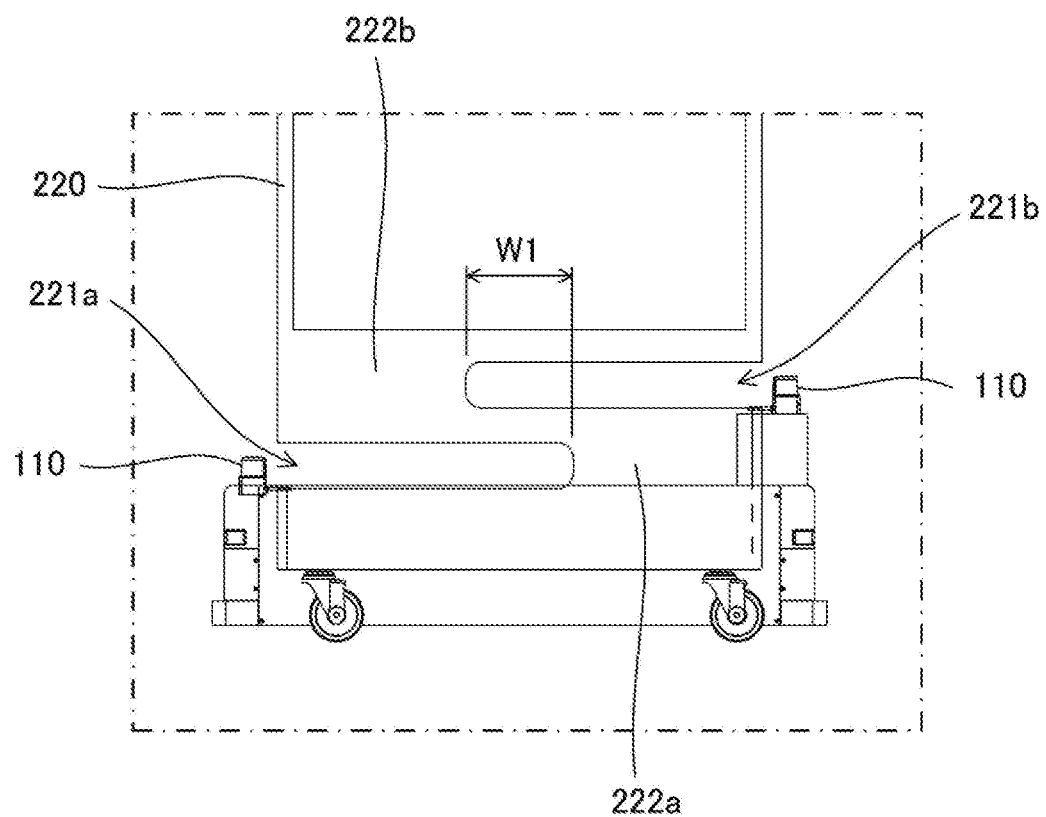
FIG. 19 is a side view illustrating the other configuration of the carriage according to the embodiment of the present disclosure.

As another embodiment, installation heights of the two distance measurement devices 110 may differ from each other. More specifically, as illustrated in FIG. 19, one (on the right side in the drawing) of the distance measurement devices 110 is arranged at a higher position than the other (on the left side in the drawing) of the distance measurement device 110. As a result, heights (horizontal heights) of the search light in the emission direction by the distance measurement devices 110 differ. In this case, as illustrated in FIG. 19, the recess 221a on a lower side, which is provided to correspond to the distance measurement device 110 on the left side, is formed from a left end of the carriage 200 to a right side of a center thereof, and a coupling part 222a on the lower side is formed at a right end. Meanwhile, the recess 221b on an upper side, which is provided to correspond to the distance measurement device 110 on the right side, is formed from the right end of the carriage 200 to a left side of the center thereof, and the coupling part 222b on the upper side is formed at the left end. That is, the recesses 221a, 221b are provided at positions in the different height from each other. In addition, when the carriage 200 is seen from above, the two recesses 221a, 221b are provided on the side surfaces 220 such that portions (with a width W1 illustrated in FIG. 19) of the recesses 221a, 221b overlap each other in vicinity of the center. Furthermore, the two coupling parts 222a, 222b are provided on both ends of the side surface 220 so as to separate from each other.

Figure 20:
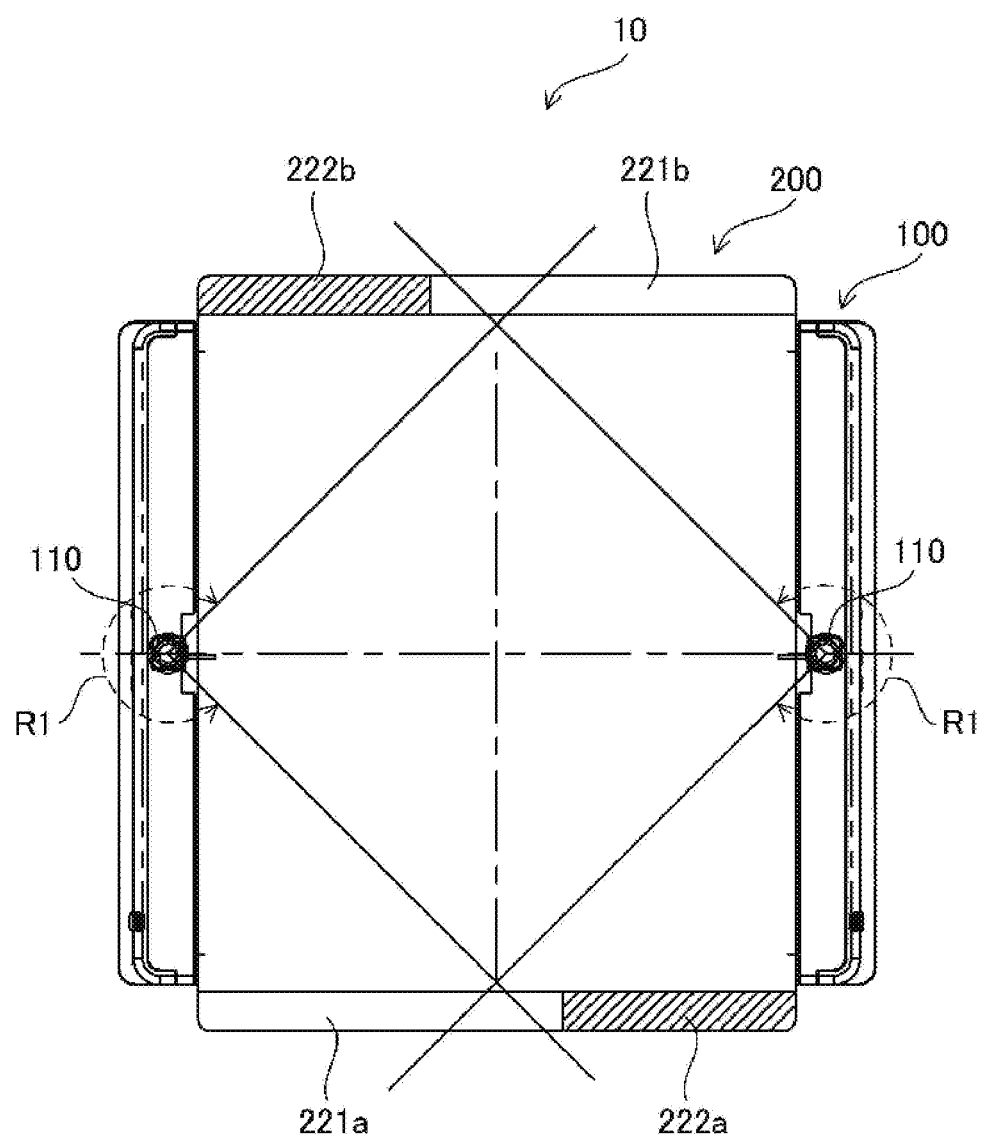
FIG. 20 is a plan view illustrating the other configuration of the carriage according to the embodiment of the present disclosure.

FIG. 20 is a plan view of FIG. 19. In FIG. 20, for the sake of convenience, the recess 221a and the coupling part 222a, which are provided on the lower side (see FIG. 19) of the carriage 200, are illustrated in a lower half of the drawing, and the recess 221b and the coupling part 222b, which are provided on the upper side (see FIG. 19) of the carriage 200, are illustrated in an upper half of the drawing. According to the above configuration, the non-irradiation region AR1 (see FIG. 16) can be reduced. As a result, an entire region around the transport system 10 is irradiated with the search light from the two distance measurement devices 110. That is, the entire region around the transport system 10 serves as the irradiation region R1. Thus, it is possible to detect the obstacle in all directions around the transport system 10.

Figure 21:
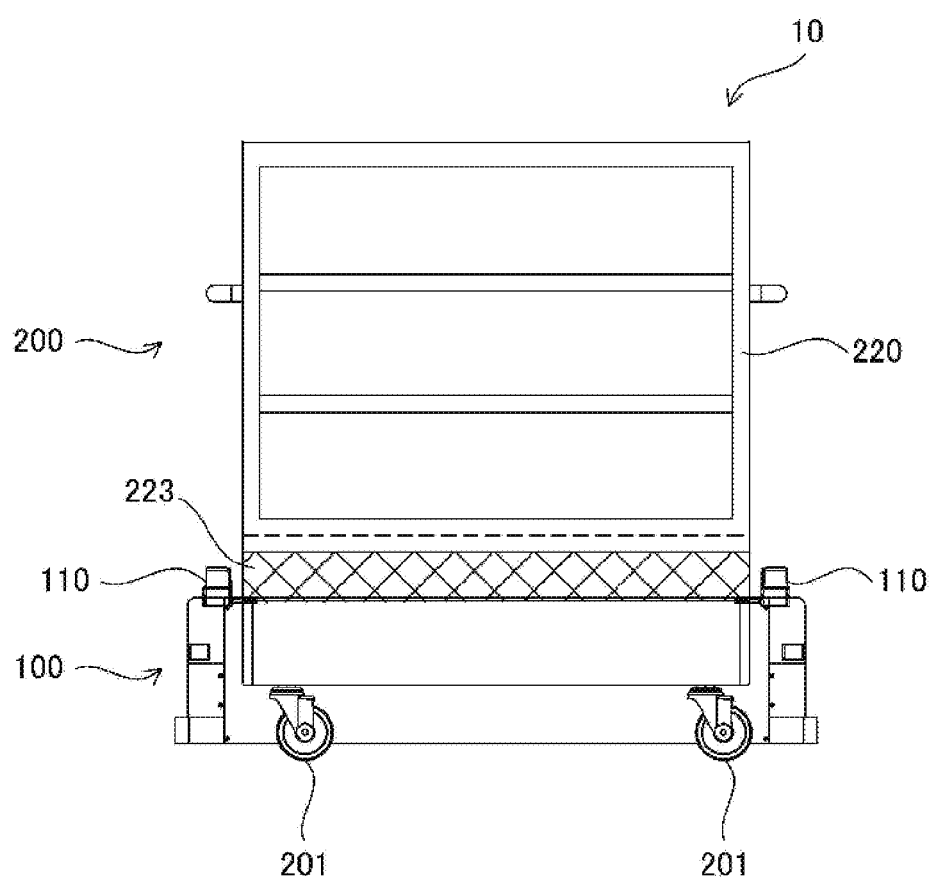
FIG. 21 is a side view illustrating the other configuration of the carriage according to the embodiment of the present disclosure.

As another embodiment, in the carriage 200, at least a portion of the side surfaces 220, which is irradiated with the search light from the distance measurement device 110, may be formed from a light transmissive material. For example, as illustrated in FIG. 21, an entire surface of a portion 223 (an example of the passing portion in the present disclosure), which is irradiated with the search light, in the side surface 220 may be formed of a transparent resin material. Alternatively, the portion 223 may partially be formed of the transparent resin material. As a result, the carriage 200 does not block the search light. Thus, it is possible to make a wide range around the transport system 10 serve as the detection region. In addition, it is possible to prevent the strength of the carriage 200 from being degraded.

Figure 22:
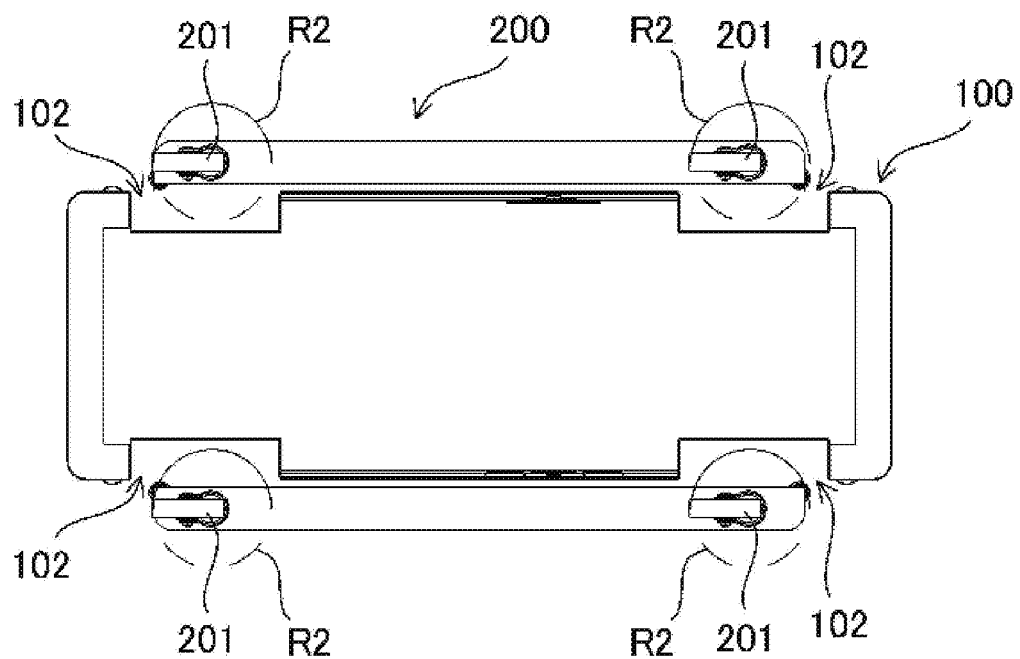
FIG. 22 is a plan view illustrating the configuration of the traveling device according to the embodiment of the present disclosure.

As another embodiment, as illustrated in FIG. 4, the side surface of the traveling device 100 may be provided with the recess 102 that corresponds to a movable range of the traveling wheel 201 of the carriage 200. More specifically, as illustrated in FIG. 22, the recess 102 is provided on the side surface such that the recess 102 is arranged in vicinity of the traveling wheel 201 when the traveling device 100 and the carriage 200 are coupled to each other. In addition, the recess 102 is provided in a manner not to overlap a turning region R2 (see FIG. 22) of the traveling wheel 201. As a result, it is possible to prevent the traveling wheel 201 from coming into contact with the traveling device 100 when the traveling wheel 201 turns and moves.

The method for coupling the traveling device 100 and the carriage 200 is not limited to the above-described method. As another embodiment, the traveling device 100 may move autonomously according to the instruction from the controller, may enter the accommodating part 250 of the carriage 200, and may then be coupled to the carriage 200.

The transport system according to the present disclosure can also be implemented by freely combining the embodiment described so far, by appropriately modifying the embodiment, or by omitting a part of the embodiment within the scope of the invention described in the claims.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A carriage towed and moved by a traveling device including a driving wheel, the carriage comprising:
a traveling wheel provided on the carriage;
a coupling part coupled to the traveling device; and
a passage which is provided on a side surface of the carriage and through which light emitted from a detector passes, the detector being provided on the traveling device to detect an obstacle around the traveling device.

2. The carriage according to claim 1, wherein
the passage is provided at a height where the passage is irradiated with the light.

3. The carriage according to claim 1, wherein
the passage is a recess that is notched from an end of the side surface.

4. The carriage according to claim 3, wherein
the side surface includes: an upper part above the recess; a lower part under the recess; and a vertical coupling part that is adjacent to the recess and couples the upper part and the lower part, and
at least a portion of the recess is arranged in an irradiation region of the light, and the vertical coupling part is arranged in a non-irradiation region of the light, when the carriage is viewed from above.

5. The carriage according to claim 4, wherein
an end of the vertical coupling part includes an inclined surface that is inclined in an emission direction of the light.

6. The carriage according to claim 1, wherein
at least a portion of the passage is formed from a light transmissive material.

7. A transport system comprising:
the carriage according to claim 3; and
the traveling device that travels while towing the carriage, wherein
the detector is arranged on an advancing direction side of the traveling device as a first detector, and on an opposite side of the advancing direction side as a second detector,
the first detector and the second detector are arranged at positions where heights of the first detector and the second detector from a floor surface differ from each other, and
on the side surface, the recess is provided at each of positions in different heights from each other so as to correspond to the first detector and the second detector, respectively.

8. The transport system according to claim 7, wherein
the recess at one of the positions and the recess at another of the positions are provided on the side surface so as to overlap partially overlap each other when the carriage is viewed from above.

9. The transport system according to claim 7, wherein
an entire region around the transport system is irradiated with the light from the first detector and the second detector.

* * * * *